United States Patent [19]
Carnes et al.

[11] Patent Number: 6,068,683
[45] Date of Patent: May 30, 2000

[54] APPARATUS FOR SEPARATING AND COLLECTING HYDROGEN GAS

[75] Inventors: Jay R. Carnes; Robert L. Nolen, Jr., both of Los Alamos, N.Mex.

[73] Assignee: The Regents of the University of California, Los Alamos, N.Mex.

[21] Appl. No.: 08/286,085

[22] Filed: Aug. 3, 1994

Related U.S. Application Data

[63] Continuation of application No. 08/066,398, May 20, 1993, abandoned.

[51] Int. Cl.[7] .................................................. B01D 53/22
[52] U.S. Cl. ...................... 96/4; 95/55; 96/108; 96/136
[58] Field of Search .................... 95/45, 55, 56, 95/116; 96/4, 10, 108, 134, 136, 140, 142

[56] References Cited

U.S. PATENT DOCUMENTS

| | | | |
|---|---|---|---|
| 3,922,872 | 12/1975 | Reilly et al. | 95/116 X |
| 4,398,926 | 8/1983 | Doshi | 95/55 |
| 4,528,003 | 7/1985 | Dittrich et al. | 96/4 |
| 4,654,063 | 3/1987 | Auvil et al. | 95/55 X |
| 4,707,342 | 11/1987 | Iniotakis | 95/55 X |
| 4,867,762 | 9/1989 | Pierini et al. | 95/116 |
| 4,976,938 | 12/1990 | Knize et al. | 95/116 X |
| 5,004,482 | 4/1991 | Haas et al. | 96/136 X |
| 5,064,446 | 11/1991 | Kusuki et al. | 95/55 X |
| 5,080,693 | 1/1992 | Bourne et al. | 95/116 X |
| 5,102,600 | 4/1992 | Ekiner et al. | 264/177.15 |
| 5,112,941 | 5/1992 | Kasai et al. | 95/55 X |
| 5,137,547 | 8/1992 | Chretien | 95/55 |
| 5,238,469 | 8/1993 | Briesacher et al. | 96/108 X |

FOREIGN PATENT DOCUMENTS

| | | | |
|---|---|---|---|
| 2548734 | 5/1977 | Germany | 95/55 |
| 2557908 | 6/1977 | Germany | 95/55 |
| 60-246203 | 12/1985 | Japan | 95/116 |
| 61-086401 | 5/1986 | Japan | 95/116 |
| 62-128902 | 6/1987 | Japan | 95/116 |
| 62-161095 | 7/1987 | Japan | 96/108 |
| 62-273025 | 11/1987 | Japan | 95/45 |
| 63-064901 | 3/1988 | Japan | 96/108 |
| 63-305296 | 12/1988 | Japan | 95/116 |

OTHER PUBLICATIONS

J.L. Maienschein, "Feasibility of Chemical Getter Beds in Scavenging Tritium From Inert Gases", Nuclear Technology, vol. 38, No. 3, May 1978, pp. 387–404 (copy in 95)116).

W.T. Shmayda et al., "Inert Gas Secondary Enclosure Clean–up System", Fusion Technology 21:2, 616–624 (Mar. 1992).

H. Ito et al., "Separation Of Tritium Using Polyimide Membranes", Fusion Technology 21:2, 988–993 (Mar., 1992).

Primary Examiner—Robert H. Spitzer
Attorney, Agent, or Firm—Samuel M. Freund

[57] ABSTRACT

Apparatus for separating and collecting hydrogen gas. A hydrogen-permeable membrane is used in combination with a trap therefor in order to separate hydrogen gas from a gas stream containing a mixture of gases. The use of a membrane selectively permeable to hydrogen protects the trap from poisoning by other components in the gas stream by substantially preventing their reaching the trap. The combination is especially useful for tritium removal and storage since β-resistant permeable membranes are now available.

9 Claims, 1 Drawing Sheet

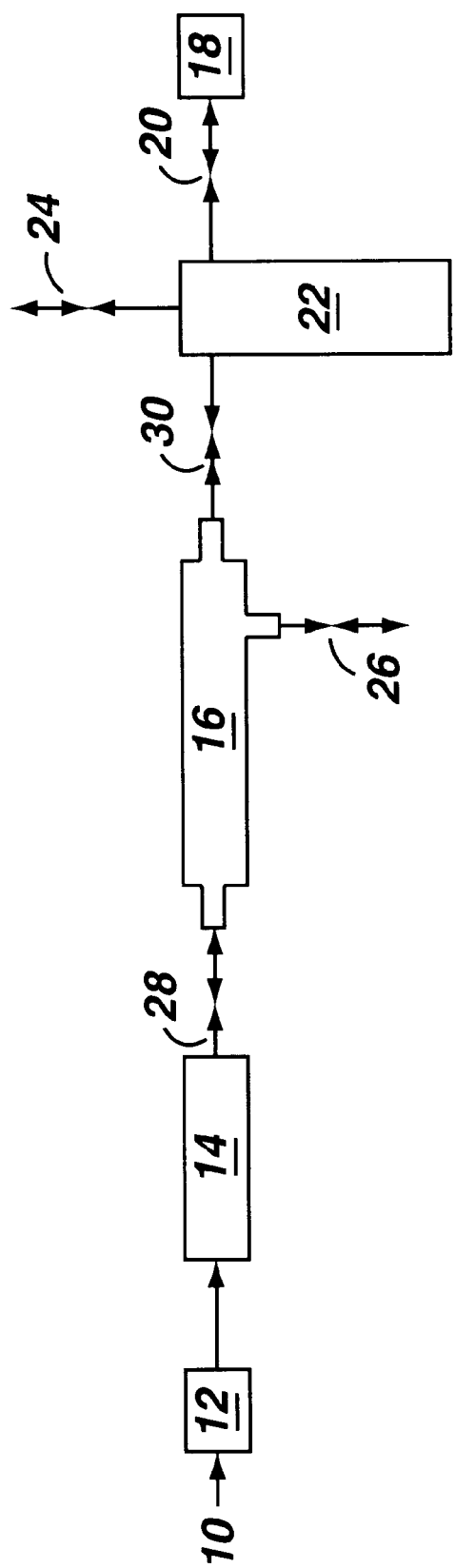
*Figure*

6,068,683

APPARATUS FOR SEPARATING AND COLLECTING HYDROGEN GAS

This is a continuation of application(s) Ser. No. 08/066,398 filed on May 20, 1993, now abandoned.

BACKGROUND OF THE INVENTION

The present invention relates generally to the separation and collection of hydrogen gas and, more particularly, to the use of membranes to prevent poisoning of gettering devices used in the collection of hydrogen gas. The invention was made with government support under Contract No. W-7405-ENG-36 awarded by the U.S. Department of Energy. The government has certain rights in this invention.

The reclamation of tritium from contaminated metals is being investigated in order to minimize tritium waste that must be buried or recovered and to save resources. Tritium in its common gaseous state can diffuse into metals so that the equipment used to handle this gas becomes contaminated. Considerable quantities of salvageable metal have been generated which, by current disposal procedures, must be cut up and buried in an appropriate disposal facility. It is known that, if such metals are heated, tritium and other gases will be released and can be pumped into recovery vessels.

The currently accepted technology for recovering tritium from tritium process systems produces tritiated water which is about 25,000 times more absorbable into the human body than is tritium gas, thereby presenting a more hazardous approach to tritium reclamation.

In W. T. Shmayda et al., "Inert Gas Secondary Enclosure Clean-Up System," Fusion Technology 21:2, 616–624 (March, 1992), the authors state that tritium removal efficiencies for zirconium-based tritides deteriorate in the presence of oxygen, carbon monoxide, water and methane. The alloy's scavenging ability may be restored by a bakeout procedure, however, if it is not already oxidized.

In H. Ito et al., "Separation Of Tritium Using Polyimide Membranes," Fusion Technology 21:2, 988–993 (March 1992), the authors identify polyimide gas membranes useful for volume reduction of tritium contaminated atmosphere by selective permeation of hydrogen. No mention is made, however, of protecting gas absorption materials from effects of impurity gases in the tritium by using such membranes.

In Okin M. Ekiner and George Vassilatos, "Polymeric Membranes," U.S. Pat. No. 5,102,600, issued Apr. 7, 1992, the inventors discuss polymeric membranes which are potentially useful for separation of hydrogen (tritium) gas from gas mixtures.

Accordingly, it is an object of the present invention to provide an apparatus for separating and collecting tritium gas in the presence of getter-passivating gases.

Another object of the invention is to provide an apparatus which is β-radiation resistant for separating and collecting tritium gas.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purposes of the present invention, as embodied and broadly described herein, the apparatus for separating and collecting hydrogen gas of this invention may include means for selectively separating gaseous hydrogen from a mixture of gases containing hydrogen and means for trapping the hydrogen gas separated by the selective hydrogen separating means. Preferably, the hydrogen gas trapping means includes metal hydrides such that the hydrogen gas may readily be recovered therefrom. It is also preferred that the selective hydrogen separating means includes membrane-based separation means.

Benefits and advantages of the invention include rapid separation and collection of hydrogen gas with a significant reduction in the poisoning of the hydrogen gas trapping means.

BRIEF DESCRIPTION OF THE DRAWING

The accompanying drawing, which is incorporated in and forms a part of the specification, illustrates an embodiment of the present invention and, together with the description, serves to explain the principles of the invention. In the FIGURE, a schematic representation of the apparatus of the present invention is illustrated.

DETAILED DESCRIPTION OF THE INVENTION

Briefly, the present invention includes the combination of a membrane-based selective separation module for separating hydrogen gas from a mixture of gases and a hydrogen trap on which hydrogen is collected. In a preferred embodiment of the invention, the trap includes a metal hydride bed such that the hydrogen may readily be recovered. The selective separation module protects the hydrogen trap from poisoning from other components in the gas mixture by passing substantially only hydrogen gas.

Reference will now be made in detail to the present preferred embodiment of the invention, an example of which is illustrated in the accompanying drawing. In the FIGURE, feed gas 10 entering compressor 12 is directed into particulate filter 14 in order to remove particles which might puncture or clog membrane-based gas separation module 16. Therein, a partial pressure differential of hydrogen gas is established across the membrane by pump 18 through valve 20 and/or gettering action by hydrogen trap 22. Hydrogen gas flows in the direction of decreasing partial pressure and is collected on trap 22 for temporary storage. Metal hydrides have been found to be suitable for this purpose since the hydrogen may be readily removed therefrom through valve 24 for purification and/or more permanent storage. The gas mixture, depleted in hydrogen, exits separation module 16 through valve 26. It should be mentioned that the gas mixture need not be flowed; rather, static volumes may be depleted of hydrogen until effectively no differential partial pressure exists across membrane separator 16. Similarly, the gettering action of trap 22 will still occur if a low pressure in the trap is not maintained by pump 18; that is, if other gases in the mixture, having passed through the membrane separator in small quantities, are not continuously removed. Polyaramide membranes developed by MEDAL, Inc. are β-radiation resistant (if tritium is intended to be separated) and have been demonstrated to be effective in the selective separation of hydrogen from gas mixtures. See, e.g. U.S. Pat. No. 5,102,600, supra.

Valves 28, 30, and 26, and valves 20, 24, and 30 permit separation module 16 and modular trap 22, respectively, to be removed for replacement or repair.

The foregoing description of the invention has been presented for purposes of illustration and description and is not intended to be exhaustive or to limit the invention to the precise form disclosed, and obviously many modifications and variations are possible in light of the above teaching. For example, if hydrogen gas is intended merely to be reacted, there are many gettering materials which might be employed.

The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for separating and collecting hydrogen gas from gas mixtures which comprises in combination:

membrane-based means for selectively separating hydrogen gas from the gas mixture;

means for bringing the gas mixture into contact with said membrane-based selective separating means for hydrogen gas, whereby a partial pressure differential is established therein;

means, for receiving and trapping the hydrogen gas which is separated from the gas mixture by said membrane-based selective separating means on the lower hydrogen partial pressure side thereof; and means for removably connecting said membrane-based means to said hydrogen gas trapping means such that hydrogen gas separated from the gas mixture may flow into said hydrogen gas trapping means from said membrane-based means, and such that said hydrogen gas trapping means may be separated from said membrane-based means.

2. The apparatus as described in claim 1, wherein said hydrogen gas trapping means comprises reversible trapping means.

3. The apparatus as described in claim 2, wherein said hydrogen gas trapping means comprises metal hydrides.

4. The apparatus as described in claim 1, wherein the hydrogen gas comprises tritium.

5. The apparatus as described in claim 1, wherein said membrane-based means is β-radiation resistant.

6. The apparatus as described in claim 1, wherein said membrane-based means comprises polyimide membranes.

7. The apparatus as described in claim 1, wherein said membrane-based means comprises polyaramide membranes.

8. The apparatus as described in claim 1, further comprising a particulate filter inserted before said selective separating means for reducing particulate deposition on and damage to said membrane-based means.

9. The apparatus as described in claim 1, further means for flowing the gas mixture through said membrane-based means.

* * * * *